(12) United States Patent
Gudapati et al.

(10) Patent No.: US 12,728,873 B2
(45) Date of Patent: Sep. 8, 2026

(54) TECHNIQUES FOR MANAGING HIGH VOLTAGE SYSTEMS FOR ELECTRIFIED VEHICLES WITH FIRMWARE OVER THE AIR FEATURES

(71) Applicant: FCA US LLC, Auburn Hills, MI (US)

(72) Inventors: Abhilash Gudapati, Troy, MI (US); Rudolf Kharpuri, Auburn Hills, MI (US); Omkar Bedarkar, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 232 days.

(21) Appl. No.: 18/619,257

(22) Filed: Mar. 28, 2024

(65) Prior Publication Data

US 2025/0304084 A1 Oct. 2, 2025

(51) Int. Cl.
*G06F 8/65* (2018.01)
*B60W 50/06* (2006.01)
*B60W 50/10* (2012.01)

(52) U.S. Cl.
CPC ............ *B60W 50/06* (2013.01); *B60W 50/10* (2013.01); *B60W 2556/45* (2020.02); *B60W 2756/10* (2020.02)

(58) Field of Classification Search
None
See application file for complete search history.

(56) References Cited

U.S. PATENT DOCUMENTS 8,589,908 B2 * 11/2013 Subbakrishna ........... G06F 8/65 717/172
9,083,581 B1 7/2015 Addepalli et al.
9,128,798 B2 * 9/2015 Hoffman .................. G06F 8/65
9,436,456 B2 * 9/2016 Danne ..................... H04L 67/06
10,248,405 B2 * 4/2019 Zymeri ..................... G06F 8/65
10,409,585 B2 * 9/2019 Troia ...................... H04L 67/34
10,416,985 B2 * 9/2019 Madrid ..................... G06F 8/65
10,447,483 B1 * 10/2019 Su ......................... H04L 9/3226
10,470,189 B2 * 11/2019 Tran ........................ H04L 67/34
10,479,297 B2 * 11/2019 Arai ........................ F02D 29/02
10,496,393 B2 * 12/2019 Okuyama ................. G06F 8/65
10,621,796 B2 * 4/2020 Gintz .................. G07C 5/0841
10,802,814 B2 * 10/2020 Miyake ..................... G06F 8/65
10,841,791 B1 * 11/2020 Zhang .................. H04W 72/51
10,958,782 B2 * 3/2021 Tran ...................... H04W 76/00
11,023,223 B2 * 6/2021 Ishikawa ................ G06F 8/654
11,036,484 B2 * 6/2021 Miller ....................... G06F 8/71
11,064,323 B2 * 7/2021 Esselink ............. G06F 16/1834
11,782,691 B2 * 10/2023 Sangameswaran ..... H04L 67/34 717/173
11,875,144 B2 1/2024 Lin et al.

(Continued)

*Primary Examiner* — Jonathan M Dager
(74) *Attorney, Agent, or Firm* — Jeremy J. Klobucar

(57) ABSTRACT

A high voltage management system for an electrified vehicle having firmware over-the-air (FOTA) capability receives, via a wireless communication medium, a FOTA flash update for a set of components of the electrified vehicle, receives, from a customer, a customer input indicating a desired time to perform the FOTA flash update, coordinates the FOTA flash update of a set of components based on the customer input, controls an electrified powertrain, including a high voltage system, of the electrified vehicle, and ignores or rejects a plurality of valid high voltage wakeup requests for the high voltage system to prevent interruption of the FOTA flash update of the set of components.

18 Claims, 3 Drawing Sheets

(56) References Cited

U.S. PATENT DOCUMENTS

| | | | | |
|---|---|---|---|---|
| 12,112,158 | B1 * | 10/2024 | Blais | G06F 11/0766 |
| 12,112,159 | B1 * | 10/2024 | Blais | G06F 11/0766 |
| 12,190,099 | B2 * | 1/2025 | Cain, Jr. | G06F 8/65 |
| 12,222,693 | B1 * | 2/2025 | Zuccone | B60K 35/00 |
| 2004/0093597 | A1 * | 5/2004 | Rao | G06F 8/65 717/170 |
| 2014/0285146 | A1 * | 9/2014 | Huston | B60N 2/3015 320/109 |
| 2015/0242198 | A1 * | 8/2015 | Tobolski | G06F 8/65 717/172 |
| 2015/0309784 | A1 * | 10/2015 | Molin | F01N 9/002 701/1 |
| 2016/0189115 | A1 * | 6/2016 | Cattone | G06Q 10/20 705/26.8 |
| 2016/0291940 | A1 * | 10/2016 | Searle | H04L 67/303 |
| 2017/0123782 | A1 * | 5/2017 | Choi | G06F 8/65 |
| 2017/0262274 | A1 * | 9/2017 | Vangelov | G06F 8/65 |
| 2017/0315798 | A1 * | 11/2017 | Shivanna | H04L 67/34 |
| 2018/0074811 | A1 * | 3/2018 | Kiyama | H04L 67/12 |
| 2018/0074813 | A1 * | 3/2018 | Granda | H04L 67/34 |
| 2018/0081670 | A1 * | 3/2018 | Caushi | G07C 5/00 |
| 2018/0102939 | A1 * | 4/2018 | Kim | H04L 67/125 |
| 2019/0258466 | A1 * | 8/2019 | Mitchell | H04L 67/34 |
| 2019/0391800 | A1 * | 12/2019 | Lin | G06F 8/65 |
| 2019/0391802 | A1 | 12/2019 | Troia et al. | |
| 2020/0065087 | A1 * | 2/2020 | Miura | H04L 67/34 |
| 2021/0019139 | A1 * | 1/2021 | Rehagen | G06F 8/65 |
| 2022/0179644 | A1 * | 6/2022 | Harata | B60R 16/02 |
| 2023/0084842 | A1 * | 3/2023 | Ng | H04W 4/50 701/32.7 |
| 2025/0094153 | A1 * | 3/2025 | Das | G06F 8/65 |
| 2025/0298599 | A1 * | 9/2025 | Albo | G06F 8/65 |
| 2025/0306661 | A1 * | 10/2025 | Gudapati | H04L 12/40 |

* cited by examiner

TECHNIQUES FOR MANAGING HIGH VOLTAGE SYSTEMS FOR ELECTRIFIED VEHICLES WITH FIRMWARE OVER THE AIR FEATURES

FIELD

The present application generally relates to electrified vehicle firmware over-the-air (FOTA) flash updates and, more particularly, to techniques for managing high voltage systems for electrified vehicles having FOTA features.

BACKGROUND

Today's electrified vehicles often include a plurality of different electronic control units (ECUs) and the capability to perform firmware over-the-air (FOTA) flash updates. FOTA flash updates are performable by the electrified vehicle in response to an FOTA broadcast and thus differ from conventional manual flash updates by a service technician via a physical diagnostic tool. Depending on network conditions and other factors, FOTA flash updates could potentially take a long time (e.g., 30+ minutes). Thus, it is desirable to offer the customer the option of when to perform the FOTA flash update (e.g., now or at a future scheduled time). However, when a high voltage wakeup or enable is received during a FOTA flash update, there could potentially be damage to the high voltage system(s). In addition, this could interrupt the FOTA flash update and prevent the FOTA flash update from completing as the customer expects. Accordingly, while such conventional FOTA flash update systems do work for their intended purpose, there exists an opportunity for improvement in the relevant art.

SUMMARY

According to one example aspect of the invention, a high voltage management system for an electrified vehicle having firmware over-the-air (FOTA) capability is presented. In one exemplary implementation, the high voltage management system comprises a FOTA supervisor module configured to receive, via a wireless communication medium, a FOTA flash update for a set of components of the electrified vehicle, receive, from a customer, a customer input indicating a desired time to perform the FOTA flash update, and coordinate the FOTA flash update of a set of components based on the customer input, and a supervisory controller configured to control an electrified powertrain, including a high voltage system, of the electrified vehicle, and ignore or reject a plurality of valid high voltage wakeup requests for the high voltage system to prevent interruption of the FOTA flash update of the set of components.

In some implementations, the plurality of valid high voltage wakeup requests for the high voltage system are non-critical wakeup requests that do not specifically relate to high voltage functionality of the electrified vehicle. In some implementations, the plurality of valid high voltage wakeup requests includes a charging request. In some implementations, the charging request is one of (i) scheduled charging of the high voltage system and (ii) scheduled conditioning of a low voltage system by the high voltage system. In some implementations, the customer selection is (i) FOTA now or (ii) FOTA scheduled at a future time.

In some implementations, when the customer selection is FOTA NOW, the FOTA supervisor sets a FOTA now status and the supervisory controller enters a faster powerdown procedure and ensures that all high voltage functionality is disabled before the FOTA flash update is performed. In some implementations, when the customer selection is FOTA scheduled, the FOTA supervisor sets a NO FOTA status and the supervisory controller and the electrified vehicle temporarily powers down until a wakeup timer expires, wherein the wakeup timer is based on a scheduled time for the FOTA flash update as specified by the customer input. In some implementations, when the wakeup timer expires, the FOTA supervisor sets a FOTA SCHEDULED status and the supervisory controller wakes up and ensures that high voltage functionality is disabled before the FOTA flash update is performed. In some implementations, when there is a timeout because no customer selection is received within a timeout period, the FOTA supervisor sets a NO FOTA status and the supervisory controller and the electrified vehicle powers down.

According to another example aspect of the invention, a high voltage management method for an electrified vehicle having FOTA capability is presented. In one exemplary implementation, the high voltage management method comprises receiving, by a FOTA supervisor via a wireless communication medium, a FOTA flash update for a set of components of the electrified vehicle, receiving, by the FOTA supervisor and from a customer, a customer input indicating a desired time to perform the FOTA flash update, coordinating, by the FOTA supervisor, the FOTA flash update of a set of components based on the customer input, controlling, by a supervisory controller, an electrified powertrain, including a high voltage system, of the electrified vehicle, and ignoring or rejecting, by the supervisory controller, a plurality of valid high voltage wakeup requests for the high voltage system to prevent interruption of the FOTA flash update of the set of components.

In some implementations, the plurality of valid high voltage wakeup requests for the high voltage system are non-critical wakeup requests that do not specifically relate to high voltage functionality of the electrified vehicle. In some implementations, the plurality of valid high voltage wakeup requests include a charging request. In some implementations, the charging request is one of (i) scheduled charging of the high voltage system and (ii) scheduled conditioning of a low voltage system by the high voltage system. In some implementations, the customer selection is (i) FOTA now or (ii) FOTA scheduled at a future time.

In some implementations, when the customer selection is FOTA NOW, the FOTA supervisor sets a FOTA now status and the supervisory controller enters a faster powerdown procedure and ensures that all high voltage functionality is disabled before the FOTA flash update is performed. In some implementations, when the customer selection is FOTA scheduled, the FOTA supervisor sets a NO FOTA status and the supervisory controller and the electrified vehicle temporarily powers down until a wakeup timer expires, wherein the wakeup timer is based on a scheduled time for the FOTA flash update as specified by the customer input. In some implementations, when the wakeup timer expires, the FOTA supervisor sets a FOTA SCHEDULED status and the supervisory controller wakes up and ensures that high voltage functionality is disabled before the FOTA flash update is performed. In some implementations, when there is a timeout because no customer selection is received within a timeout period, the FOTA supervisor sets a NO FOTA status and the supervisory controller and the electrified vehicle powers down.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1A:
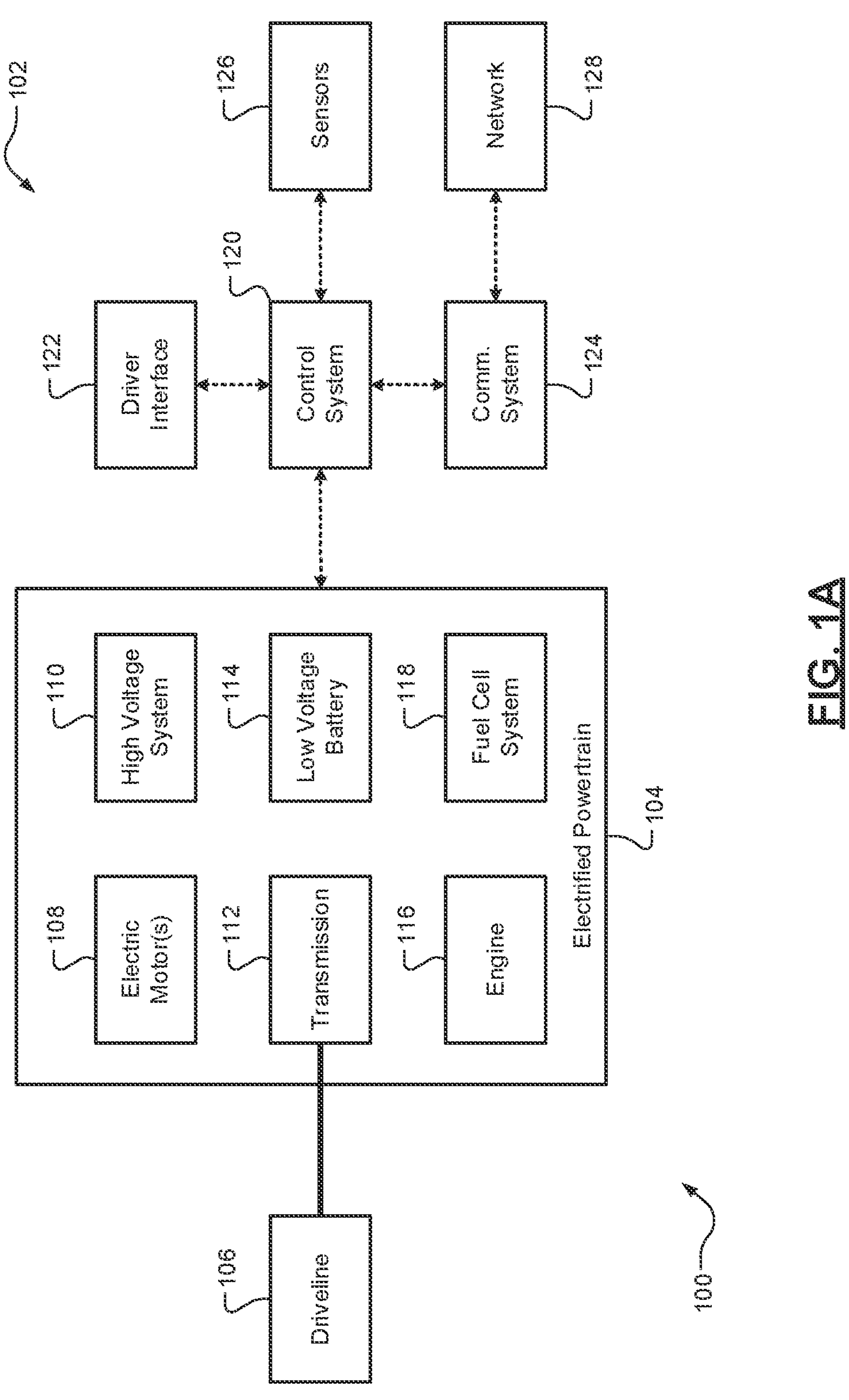
FIGS. 1A-1B are functional block diagrams of an example high voltage management system for an electrified vehicle having firmware over-the-air (FOTA) capability according to the principles of the present application.

As previously discussed, it is desirable to offer the customer the option of when to perform the FOTA flash update (e.g., now or at a future scheduled time). However, when a high voltage wakeup or enable is received during a FOTA flash update, there could potentially be damage to the high voltage system(s). In addition, this could interrupt the FOTA flash update and prevent the FOTA flash update from completing as the customer expects. One conventional solution from other original equipment manufacturers (OEMs) is to employ preset or predefined delays (e.g., 15 seconds) to allow the high voltage system to discharge and isolate before the FOTA flash update begins. Such delays, however, are sometimes insufficient as the high voltage system shutdown period could be much longer (e.g., when after-run activities are occurring). Extending these delays even further would increase and thus negative impact the overall target of ~30 minutes or less to complete the FOTA flash update and thus would be undesirable or unpleasant for the customer. Other OEM solutions such as physically locking or preventing access to the electrified vehicle (doors, charging port, etc.) are also impractical as the customer may only need brief access to the electrified vehicle without any intention to access the high voltage system.

The above-described problems and other considerations for the improved systems/methods of the present application will now be discussed in greater detail. As mentioned, in response to a received FOTA flash update, the customer could be presented with a selectable option (e.g., on a touch display): (1) FOTA Now or (2) FOTA Scheduled (i.e., FOTA later, at a scheduled time). This presents a problem on electrified vehicles due to how the shutdown process occurs on a high voltage system unlike conventional vehicle propulsion systems (e.g., engine-only propulsion systems). The high voltage propulsion system needs to have the high voltage bus completely discharge before the electrified powertrain (ePT) components get into a powerdown state. The average time that this can take can range from ~13-45 seconds for a normal shutdown based on the high voltage hardware capability, or greater in some cases based on the after-shutdown processes that a high voltage propulsion system can have such as thermal after-run to condition the components (engine, fuel cell system, etc.) after an exhaustive drive cycle. If the customer selects FOTA Now, the FOTA supervisor will immediately start flashing the target controllers/ECUs. If one of the target ECUs is an electrified propulsion related electronic control unit (ECU), it might cause damage to the high voltage system or cause the ECU to become corrupted due to their pending activities.

Similarly, if the system was performing some high voltage activity such as charging (e.g., a 12V periodic wakeup in an ignition-off state), a FOTA Scheduled update can happen right after the high voltage functions ends or the high voltage function can essentially be disabled for the FOTA flash update to begin. If the FOTA supervisor were to immediately start flashing the ECUs, if one of the ECUs is an electrified propulsion related ECU, it could potentially cause damage to the high voltage system or cause the ECUs to become corrupted due to their pending activities. As discussed above, one conventional solution is to have a preset or predefined delay (e.g., ~15 seconds) on the FOTA supervisor before the flash update or installation process begins to allow the high voltage system to open the high voltage bus contactor(s) and discharge the high voltage bus. As noted above, this solution will not be enough to have a robust system and protect ECUs and the high voltage components and meet high voltage safety requirements needed for electrified propulsion vehicles.

Furthermore, the delay on FOTA flash update installation cannot be extended further (i.e., the 15 second delay cannot be substantially increased) as it would cause customer annoyance or confusion as the FOTA flash update is expected to start without delays and also the maximum time to complete FOTA will within ~30 minutes as a part of the campaign. This ~30 minute target becomes an even bigger obstacle based on the number of ECUs/modules that need to be flashed. For example, in some cases there can be 6-7 modules that need to be flashed in a single campaign. In the future, there will also likely be even more modules that would need to be flashed in a single campaign (i.e., as technology advances and the number of ECUs/modules further increases). There can also be cases after key-off where the customer can take longer to initiate the FOTA selection (FOTA Now or FOTA Scheduled). For example, for FOTA Now, there could be other valid wakeups such as door ajar for ePT modules to stay awake after ignition-off (e.g., plugging in electrified vehicle supply equipment, or EVSE) which would cause a conflict with process where the FOTA supervisor is attempting to start the flashing process and the propulsion system is powering down.

There are also cases where the ePT supervisory controller may not be part of a campaign, but other propulsion controllers might be flashed, in a scenario that a valid high voltage wakeup reason like EVSE plug-in, door ajar, or when the electrified vehicle is plugged-in and any other valid wake up occurs. In these cases, the ePT supervisory controller could enable high voltage system when it is not actually needed during an ongoing FOTA flash update process. These wakeups are possible because the customer can still access the electrified vehicle and specific rules during FOTA flash update (e.g., staying silent on the bus from the ePT supervisory controller to a body control module, or BCM) might not be applicable, because the same module will send critical FOTA enable information to the FOTA supervisor. For example, an arbitrated Ignition status is managed by the BCM, and the FOTA supervisor (e.g., a security gateway module, or SGW) uses that information as a part for FOTA enable/disable). The current systems do not wakeup the bus, but if the bus is awake, the values of controller area network (CAN) signals will be updated and that can become one of the reason to enable high voltage functions on the ePT supervisory controller. Allowing certain FOTA behavior will allow customer accessing the electrified vehicle during the FOTA flash update process, which also means that the customer can plug-in/out the EVSE during this time. This creates a condition to enable high voltage system.

For example, the conditions for the electrified vehicle to begin FOTA flashing or to be in a FOTA flash-ready state could include: (1) electrified vehicle ignition-off; (2) electrified vehicle speed is zero; (3) 12V battery SOC is greater than a threshold (e.g., 75%), (4) the electrified vehicle is in park and an electronic park brake (EPB) is applied; (5) the propulsion system is inactive; (6) charging/discharging is not active; (7) the charging system is not faulted; and (8) no conflicts exist or are present with the propulsion system functions, such as refueling or other similar periodic functions. It will be appreciated that in some implementations, the customer would be able to choose the priority for charging/discharging, such as picking FOTA flash updating to avoid conflicts while not charging. Similarly, during a FOTA Scheduled flash update that is ongoing can conflict with a real-time clock wake up that the ePT supervisory controller already set, a real-time clock wakeup will cause a systemic wakeup and is a reason for the ePT supervisory controller to enable high voltage. Thus, all these concerns need to be addressed through the high voltage management systems and methods presented herein to ensure that all of the ECUs and the high voltage components are protected and the system meets high voltage safety requirements needed for electrified propulsion vehicles.

Accordingly, improved high voltage management systems and methods for electrified vehicles having FOTA capabilities are presented herein. The high voltage management systems and methods utilize a FOTA supervisor module (e.g., a SGW module) that is configured to receive, via a wireless communication medium, a FOTA flash update for a set of components of the electrified vehicle, receive, from a customer, a customer input indicating a desired time to perform the FOTA flash update, and coordinate the FOTA flash update of a set of components based on the customer input. The high voltage management systems and methods also utilize a supervisory controller (e.g., an ePT supervisory controller) configured to control an electrified powertrain, including a high voltage system, of the electrified vehicle, and ignore or reject a plurality of valid high voltage wakeup requests for the high voltage system to prevent interruption of the FOTA flash update of the set of components. This ensures that FOTA flash updates will not be interrupted or unduly delayed while also protecting customers and the high voltage system and the electrified vehicle from potential damage.

Figure 1B:
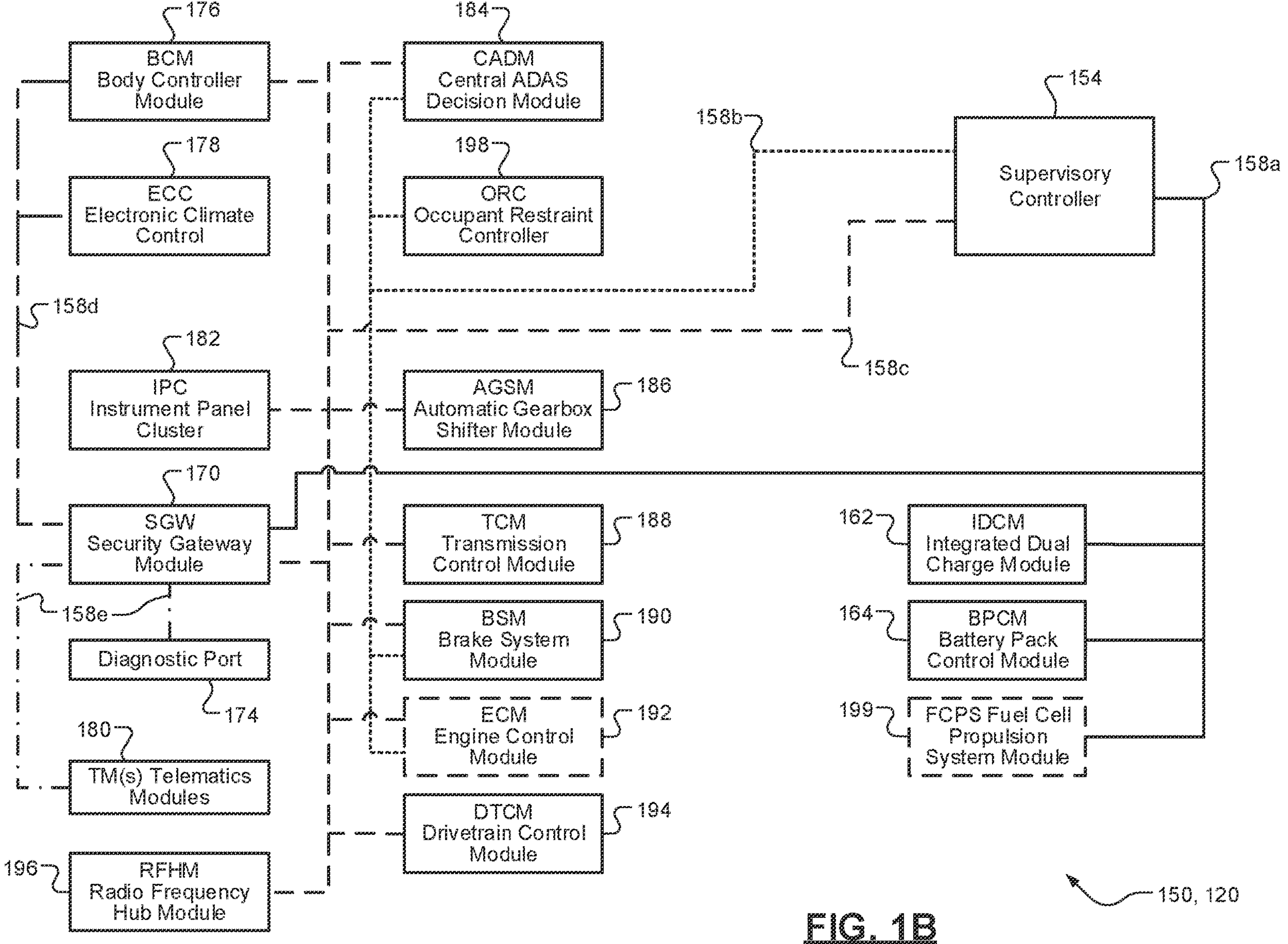

Referring now to FIGS. 1A-1B, functional block diagrams of an electrified vehicle 100 (also referred to as "vehicle 100") and an example high voltage management system 102, 150 according to the principles of the present application is illustrated. The electrified vehicle 100 generally comprises an electrified powertrain 104 configured to generate and transfer drive torque to a driveline 106 for propulsion of the electrified vehicle 100. The electrified powertrain 104 includes at least one electric motor 108 that is powered by a high voltage system 110 (a high voltage battery pack/system, a high voltage bus, contactor(s), etc.) and is configured to generate torque that is transferred to the driveline 106 via a transmission 112 (e.g., a multi-speed automatic transmission). The electrified powertrain 104 also includes a low voltage (12V) system or battery 114 configured to power low voltage loads (not shown). In some implementations, the electrified powertrain 104 further includes an internal combustion engine 116 or a fuel cell system 118 arranged in any suitable configuration and configured to generate additional electrical energy such as for recharging the high voltage battery system 110. The high voltage management system 102 of the present application can include components of both a controller or control system 120 of the electrified vehicle 100 as well as the high voltage system 110.

The control system 120 controls operation of the electrified vehicle 100, including primarily controlling the electrified powertrain 104 to generate and transfer a desired amount of drive torque to the driveline 106 to satisfy a driver torque request via a driver interface 122, such as an accelerator pedal. The control system 120 controls the electrified powertrain 104 and other systems as described in greater detail herein based on measurements from a plurality of sensors 126. The plurality of sensors 126 are configured to measure any suitable parameters of the electrified vehicle 100 for use in controlling the same, such as, but not limited to, speeds, torques, temperatures, pressures, and the like. The electrified vehicle 100 also includes a communication system 124 (e.g., one or more transceivers) configured to receive FOTA flash update requests/data from a FOTA master (e.g., a backend server, not shown) via a network 128, such as a long-range wireless communication network (e.g., a cellular data network). The control system 120 is also configured to perform at least a portion of the FOTA flash update control techniques of the present application, which will now be discussed in greater detail below.

FIG. 1B illustrates a specific configuration 150 of the control system 120. As shown, the control system 120 includes a propulsion or ePT supervisory controller (SC) 154 (e.g., a power inverter module, or PIM) for controlling propulsion (i.e., the electrified powertrain 104) such as, for example, first and second electric motors 108 (e.g., Motors A and B) of the electrified powertrain 108. In one exemplary implementation, the supervisory controller 154 could include a hybrid control processor (not shown) a separate auxiliary HCP (AHCP, not shown) that are configured to perform at least some redundant functions for improved functional safety. The supervisory controller 154 is wakeable via a CAN 158 (CAN bus 158*a*). Other modules on bus 158*a* (also referred to as an electrified powertrain or "ePT" bus 158*a*) include an integrated dual charge module (IDCM) 162, a battery pack control module (BPCM) 164, an optional fuel cell propulsion system (FCPA) controller 199, and a security gateway (SGW) module 170. The SGW module 170 is connected to a traditional diagnostic interface port 174 and a FOTA supervisor controller or module is the SGW module 170 in this configuration. Thus, for the remainder of this description, the SGW module 170 can also be referred to as the "FOTA supervisor 170" or the "FOTA supervisor module 170."

The remaining components of the control system 120 are illustrated and generally include: a body controller module (BCM) 176 and an electronic climate control (ECC) 178 on a CAN bus 158*d* with the SGW module 170, one or more telematics modules (TMs) 180 on a CAN bus 158*e* with the SGW module 170, an instrument panel cluster (IPC) 182, a central advanced driver-assistance system (ADAS) decision module (CADM) 184, an automatic gearbox shifter module (AGSM) 186, a transmission control module (TCM) 188, a brake system module (BSM) 190, an optional engine control module (ECM) 192, a drivetrain control module (DTCM) 194, a radio frequency hub module (RFHM) 196 on a CAN bus 158*c* with the SGW module 170, the BCM 176, and the supervisory controller 154, and an occupant restraint controller (ORC) 198 on a CAN bus 158*b* with the CADM module 184, the BSM 190, the ECM 192, and the supervisory controller 154. It will be appreciated that there can also be other modules/components that are not illustrated, such as other local interconnect networks (LINs) and the like. It will be appreciated that the illustrated configuration 150 is merely one example configuration or architecture for the control system 120 and the techniques of the present application are applicable to any suitably-configured control systems.

Figure 2:
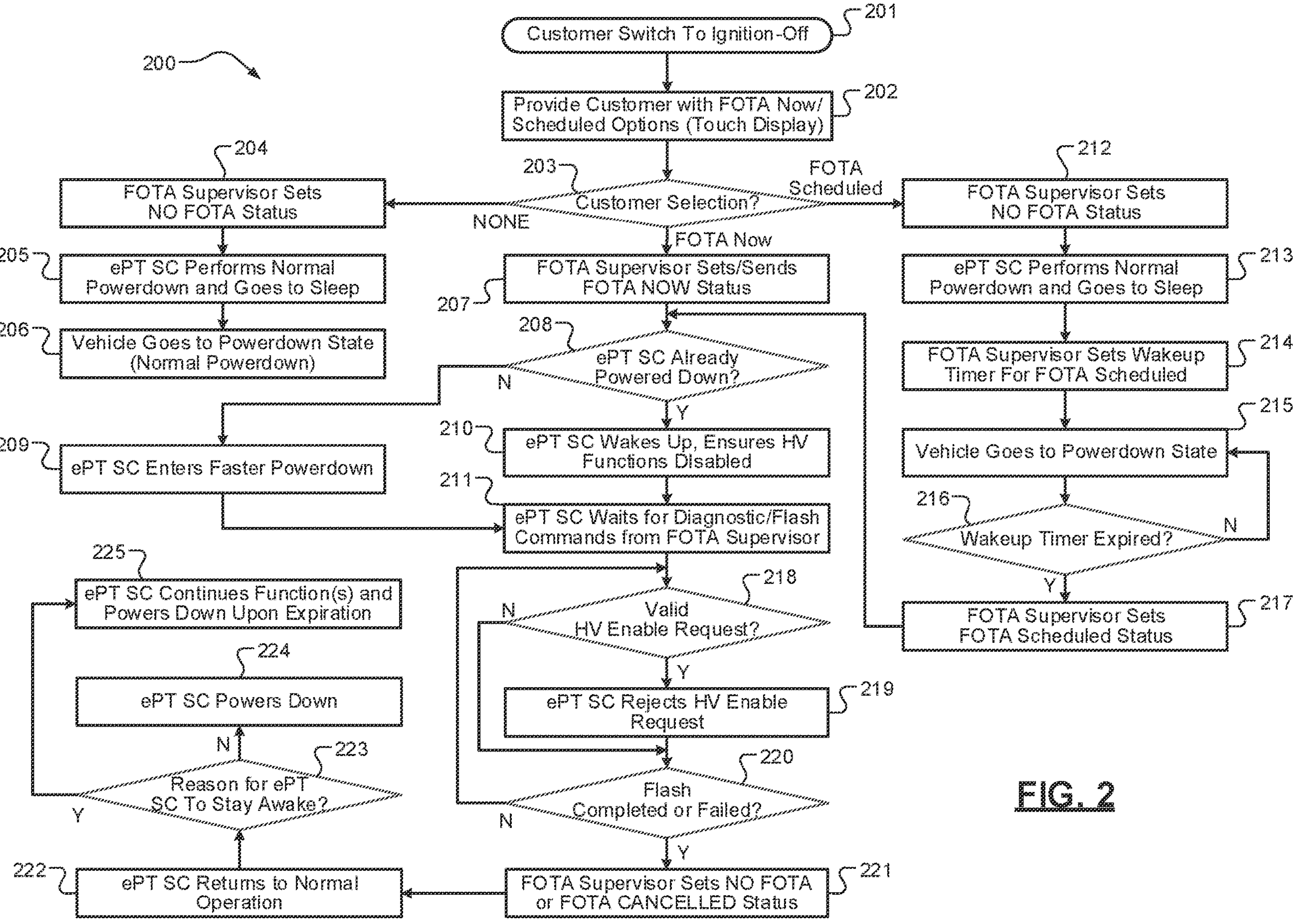
FIG. 2 is a flow diagram of an example high voltage management method for an electrified vehicle having FOTA capability according to the principles of the present application.

Referring now to FIG. 2, a flow diagram of an example high voltage management method 200 for an electrified vehicle having FOTA capability according to the principles of the present application is illustrated. While the method 200 references the electrified vehicle 100 and its control system 120, 150, it will be appreciated that the method 200 could be applicable to any suitably configured electrified vehicle. The method 200 begins at 201 where the customer turns an ignition switch to an ignition-off status. At 202, the customer is provided with a selection of either (1) FOTA Now or (2) FOTA Scheduled for a recently received FOTA flash update. This could be, for example, a user interface displayed via a touch display of the driver interface 122 or the IPC 182. At 203, it is determined whether the customer has made a selection and, if so, which selection he/she has made. When no selection (NONE) is received, the method 200 proceeds to 204. When the FOTA Now selection is received, the method 200 proceeds to 207. When the FOTA Scheduled selection (e.g., along with a scheduled/selected time) is received, the method 200 proceeds to 212. At 204, the FOTA supervisor 170 sets a NO FOTA status indicating that no FOTA flash update is to be performed during this cycle. At 205, the ePT SC 154 performs a normal powerdown procedure and then goes to sleep. At 206, the electrified vehicle 100 goes to a powerdown state (a normal powerdown procedure) and the method 200 ends or returns to 201 during a next ignition-off cycle.

At 207, the FOTA supervisor 170 sets or sends (via the CAN) a FOTA NOW signal or status indicative of the FOTA Now selection by the customer. At 208, it is determined whether the ePT SC 154 has already powered down. When false, the method 200 proceeds to 209. When true, the method 200 proceeds to 210. At 209, the ePT SC 154 enters a faster powerdown procedure or process in response to the FOTA NOW signal/status and the method 200 then proceeds to 211. At 210, after the FOTA NOW signal/status, the ePT SC 154 wakes up and ensures that HV functionality is disabled. The ePT SC 154 could also enter a faster powerdown procedure or shutdown mode (similar to 209). The method 200 then proceeds to 211. At 212, the FOTA supervisor 170 sets or sends (via the CAN) a NO FOTA signal or status indicative of the FOTA Scheduled selection by the customer. At 213, the ePT SC 154 performs a normal powerdown procedure and then goes to sleep. At 214, the FOTA supervisor 170 sets or enables a wakeup timer for the FOTA Scheduled time (as part of the customer selection at 203). At 215, the electrified vehicle 100 goes to a powerdown state. At 216, it is determined whether the wakeup timer has expired. When false, the method 200 returns to 216. When true, the method 200 proceeds to 217. At 217, the FOTA supervisory 170 sets or sends (via the CAN) a FOTA SCHEDULED signal or status indicative of the scheduled FOTA flash update now being ready to occur. The method 200 then proceeds to 209.

At 211, the ePT SC 154 waits for diagnostic/flash commands from the FOTA supervisor 170 as part of the FOTA flash update process. The method 200 then proceeds to 218. At 218, it is determined whether a valid HV enable request has been received (e.g., one of the acceptable and anticipated situations as previously discussed herein). When false, the method 200 proceeds to 220. When true, the method 200 proceeds to 219. At 219, the ePT SC 154 rejects the HV enable request. At 220, it is determined whether the FOTA flash update has completed or otherwise failed (i.e., no longer occurring). When false, the method 200 returns to 218. When true, the method 200 proceeds to 221. At 221, the FOTA supervisor 170 sets or sends (via the CAN) a NO FOTA or FOTA CANCELLED signal or status indicative of how the FOTA flash update went. At 222, the ePT SC 154 returns to normal operation. At 223, the ePT SC 154 determines whether there are any reason(s) for it to remain awake (e.g., remaining functions). When false, the method 200 proceeds to 224 where the ePT SC powers down and the method 200 ends. When true, the method 200 proceeds to 225 where the ePT SC 154 completes its remaining function (s) and then powers down and the method 200 ends. The method 200 could also then return to 201 during a next ignition-off cycle.

It will be appreciated that the terms "controller" and "control system as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A high voltage management system for an electrified vehicle having firmware over-the-air (FOTA) capability, the high voltage management system comprising:

a FOTA supervisor configured to:

receive, via a wireless communication medium, a FOTA flash update for a set of components of the electrified vehicle, receive, from a customer, a customer selection indicating a desired time to perform the FOTA flash update, and coordinate the FOTA flash update of a set of components based on the customer selection; and a supervisory controller configured to:

control an electrified powertrain, including a high voltage system, of the electrified vehicle, and ignore or reject a plurality of valid high voltage wakeup requests for the high voltage system to prevent interruption of the FOTA flash update of the set of components, wherein the plurality of valid high voltage wakeup requests for the high voltage system are non-critical wakeup requests that do not specifically relate to high voltage functionality of the electrified vehicle.

2. The high voltage management system of claim 1, wherein the plurality of valid high voltage wakeup requests includes a charging request.

3. The high voltage management system of claim 2, wherein the charging request is one of (i) scheduled charging of the high voltage system and (ii) scheduled conditioning of a low voltage system by the high voltage system.

4. The high voltage management system of claim 1, wherein the customer selection is (i) FOTA NOW or (ii) FOTA SCHEDULED at a future time.

5. The high voltage management system of claim 4, wherein when the customer selection is FOTA NOW, the FOTA supervisor sets a FOTA NOW status and the supervisory controller enters a faster powerdown procedure and ensures that all high voltage functionality is disabled before the FOTA flash update is performed.

6. The high voltage management system of claim 4, wherein when the customer selection is FOTA SCHEDULED, the FOTA supervisor sets a NO FOTA status and the supervisory controller and the electrified vehicle temporarily powers down until a wakeup timer expires, wherein the wakeup timer is based on a scheduled time for the FOTA flash update as specified by the customer selection.

7. The high voltage management system of claim 6, wherein when the wakeup timer expires, the FOTA supervisor sets a FOTA SCHEDULED status and the supervisory controller wakes up and ensures that high voltage functionality is disabled before the FOTA flash update is performed.

8. The high voltage management system of claim 4, wherein when there is a timeout because no customer selection is received within a timeout period, the FOTA supervisor sets a NO FOTA status and the supervisory controller and the electrified vehicle powers down.

9. A high voltage management method for an electrified vehicle having firmware over-the-air (FOTA) capability, the high voltage management method comprising:

receiving, by a FOTA supervisor via a wireless communication medium, a FOTA flash update for a set of components of the electrified vehicle;

receiving, by the FOTA supervisor and from a customer, a customer selection indicating a desired time to perform the FOTA flash update;

coordinating, by the FOTA supervisor, the FOTA flash update of a set of components based on the customer selection;

controlling, by a supervisory controller, an electrified powertrain, including a high voltage system, of the electrified vehicle; and ignoring or rejecting, by the supervisory controller, a plurality of valid high voltage wakeup requests for the high voltage system to prevent interruption of the FOTA flash update of the set of components, wherein the plurality of valid high voltage wakeup requests for the high voltage system are non-critical wakeup requests that do not specifically relate to high voltage functionality of the electrified vehicle.

10. The high voltage management method of claim 9, wherein the plurality of valid high voltage wakeup requests include a charging request.

11. The high voltage management method of claim 10, wherein the charging request is one of (i) scheduled charging of the high voltage system and (ii) scheduled conditioning of a low voltage system by the high voltage system.

12. The high voltage management method of claim 9, wherein the customer selection is (i) FOTA NOW or (ii) FOTA SCHEDULED at a future time.

13. The high voltage management method of claim 12, wherein when the customer selection is FOTA NOW, the FOTA supervisor sets a FOTA NOW status and the supervisory controller enters a faster powerdown procedure and ensures that all high voltage functionality is disabled before the FOTA flash update is performed.

14. The high voltage management method of claim 12, wherein when the customer selection is FOTA SCHEDULED, the FOTA supervisor sets a NO FOTA status and the supervisory controller and the electrified vehicle temporarily powers down until a wakeup timer expires, wherein the wakeup timer is based on a scheduled time for the FOTA flash update as specified by the customer selection.

15. The high voltage management method of claim 14, wherein when the wakeup timer expires, the FOTA supervisor sets a FOTA SCHEDULED status and the supervisory controller wakes up and ensures that high voltage functionality is disabled before the FOTA flash update is performed.

16. The high voltage management method of claim 12, wherein when there is a timeout because no customer selection is received within a timeout period, the FOTA supervisor sets a NO FOTA status and the supervisory controller and the electrified vehicle powers down.

17. A high voltage management system for an electrified vehicle having firmware over-the-air (FOTA) capability, the high voltage management system comprising:

a FOTA supervisor module configured to:

receive, via a wireless communication medium, a FOTA flash update for a set of components of the electrified vehicle, receive, from a customer, a customer selection indicating a desired time to perform the FOTA flash update, wherein the customer selection is (i) FOTA NOW or (ii) FOTA SCHEDULED at a future time, and coordinate the FOTA flash update of a set of components based on the customer input; and a supervisory controller configured to:

control an electrified powertrain, including a high voltage system, of the electrified vehicle, and ignore or reject a plurality of valid high voltage wakeup requests for the high voltage system to prevent interruption of the FOTA flash update of the set of components, wherein at least one of:

(i) when the customer selection is FOTA NOW, the FOTA supervisor sets a FOTA NOW status and the supervisory controller enters a faster powerdown procedure and ensures that all high voltage functionality is disabled before the FOTA flash update is performed; and (ii) when the customer selection is FOTA SCHEDULED, the FOTA supervisor sets a NO FOTA status and the supervisory controller and the electrified vehicle temporarily powers down until a wakeup timer expires, wherein the wakeup timer is based on a scheduled time for the FOTA flash update as specified by the customer selection.

18. The high voltage management system of claim 17, wherein the plurality of valid high voltage wakeup requests for the high voltage system are non-critical wakeup requests that do not specifically relate to high voltage functionality of the electrified vehicle.

* * * * *